United States Patent [19]
Nelson et al.

[11] 3,852,623
[45] Dec. 3, 1974

[54] TIMING CIRCUIT

[75] Inventors: Robert E. Nelson; Oran A. Watts, III, both of Indianapolis, Ind.

[73] Assignee: General Motors Corporation, Detroit, Mich.

[22] Filed: July 12, 1973

[21] Appl. No.: 378,800

Related U.S. Application Data
[62] Division of Ser. No. 227,811, Feb. 22, 1972.

[52] U.S. Cl................ 307/293, 307/246, 307/251, 307/304
[51] Int. Cl............................................. H03k 17/26
[58] Field of Search........... 307/293, 251, 304, 246

[56] References Cited
UNITED STATES PATENTS

| | | | |
|---|---|---|---|
| 3,365,586 | 1/1968 | Billings | 307/293 |
| 3,392,352 | 7/1968 | White | 307/293 |
| 3,414,735 | 12/1968 | Harris et al. | 307/293 |
| 3,473,054 | 10/1969 | Wieczorek | 307/293 |
| 3,566,307 | 2/1971 | Morris | 307/293 |
| 3,622,811 | 11/1971 | Houpt | 307/293 |
| 3,693,031 | 9/1972 | Eaton | 307/293 |

*Primary Examiner*—Stanley D. Miller, Jr.
*Attorney, Agent, or Firm*—Paul Fitzpatrick

[57] ABSTRACT

A timing circuit for energizing an output line a predetermined time after energization of a start of input line. The timer charges a capacitor through an FET operating in a self-biased mode so that current flow is constant and voltage rise is linear with time. The potential of the capacitor is applied to the gate of a second FET, the drain of which is connected to ground through a controlled voltage circuit. When the capacitor voltage reaches a sufficiently high level, the second FET conducts and energizes a transistor which supplies the output circuit. The timer also includes a reset switch which may be closed to discharge the capacitor.

2 Claims, 1 Drawing Figure

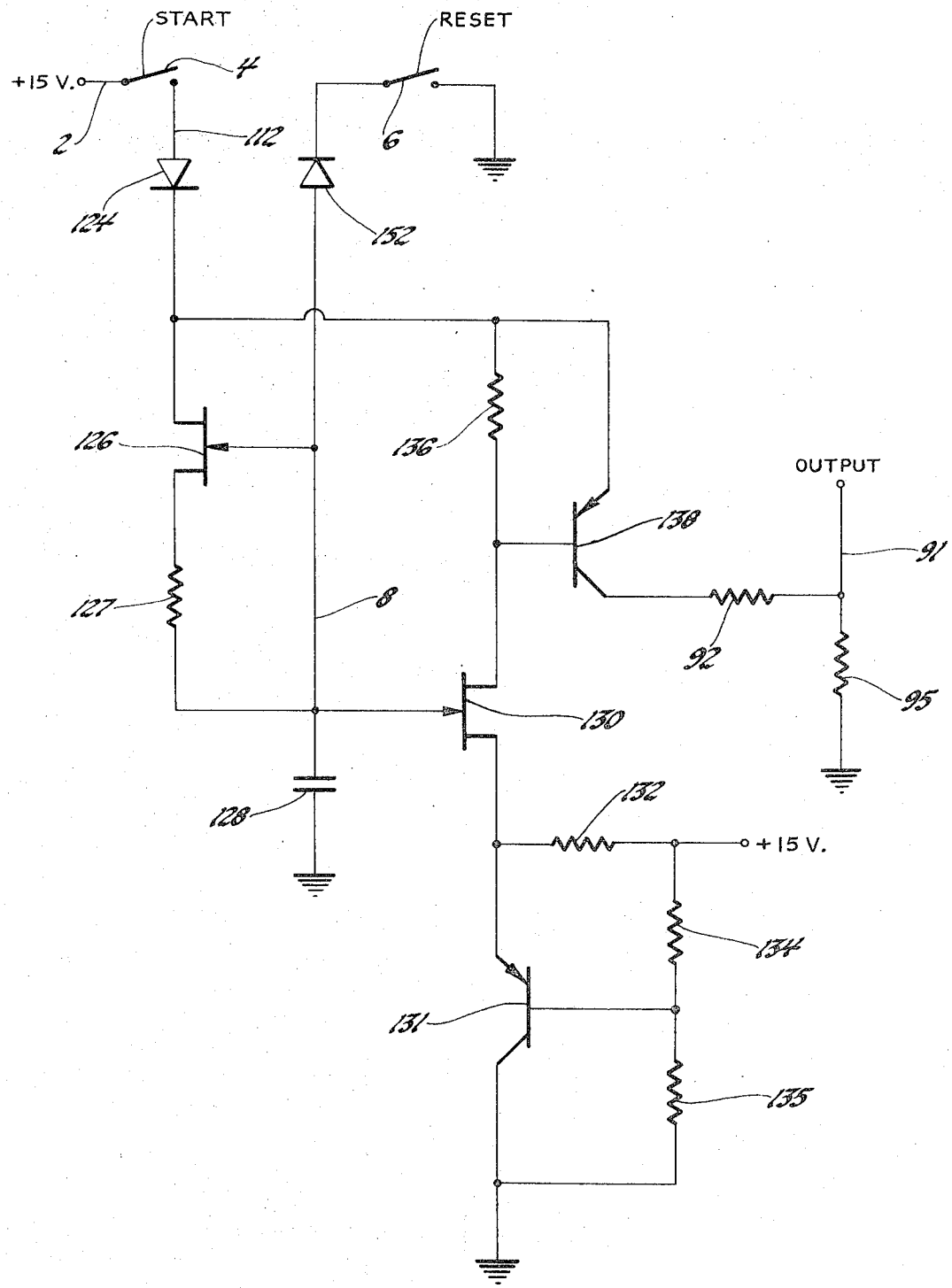

TIMING CIRCUIT

The invention described and claimed herein was made in the course of work under a contract with the Department of Defense.

This application is a division of our application Ser. No. 227,811 for Automatic Relight filed Feb. 22, 1972.

Our invention is directed to a timing circuit, and particularly to a simple and accurate timing circuit adapted to measure moderate intervals of time. A specific application of the timing circuit is in a relight circuit for a gas turbine engine effective to reignite the flame in the engine after a flameout. In that application, the circuit is employed to measure a 2.8 second time interval during which the engine ignition is kept energized. The timer is capable of use in various applications, however, and the time cycle of the timer may be varied by the adjustment of values of the elements of the circuit.

The objects of our invention are to provide a simple, accurate, and compact timing circuit which will operate an output a predetermined time after the initiation of an input signal. A further object is to provide such a circuit which may be reset to zero time at any time during the timing period.

The nature of our invention and its advantages will be clear from the succeeding detailed description of a preferred embodiment of the invention and the accompanying drawing.

The figure is a wiring diagram of a timing circuit.

Before proceeding to the detailed description, it may be pointed out that the start, reset, and output circuits of the timer in the relay circuit of our patent application Ser. No. 227,811 are connected through transistorized circuits as part of a relatively complex system. However, to explain the timing circuit which is the subject of this application, the start and reset are represented by switches which perform the function of switching transistors, and the transistor controlled by the output of the timing circuit is not illustrated.

Values are given in the succeeding text for components and components are identified for purpose of disclosure; but it will be appreciated that these may be varied for diverse requirements, particularly to change the timing cycle or to adapt the timer to different supply potentials.

Considering the details of the circuit, the timing circuit receives an input from a plus 15 volt supply, which is held at accurate voltage level, through a line 2 and a normally open start switch 4. When the switch is closed, the timing circuit is energized through a line 112 and the timing interval is started. The input through line 112 is fed through an isolating diode 124 to the source of an FET 126, the drain of which is connected through a self-biasing resistor 127 (100 kilohm) to a timing capacitor 128 (2.7 mf), the other terminal of which is grounded. The gate of the FET 126 is connected between resistor 127 and capacitor 128. The resistor 127 acts to maintain constant current through FET 126 by a self-biasing effect. As will be seen, if current through the FET increases, the drop in resistor 127 will increase, raising the drain voltage level and thereby lowering the relative voltage on the gate of the FET. An automatic balance is thus maintained, holding the current through the resistor constant at a value which balances with the characteristics curve of the FET. The timing capacitor 128 thus charges linearly rather than exponentially and the charging rate is controlled accurately.

The potential stored in capacitor 128 is supplied to the gate of an FET 130, the drain of which is connected to a constant voltage circuit constituted by transistor 131 and resistors 132 (10 kilohms), 134 (4.99 kilohms), and 135 (10 kilohm). The emitter of the transistor is energized from the regulated 15 volt source through resistor 132 and its collector is grounded. The base is energized by the voltage divider circuit comprising resistors 134 and 135 which maintain the base at a constant potential, about 10 volts, and thus the emitter at 10½ volts, dropped through resistor 132. With the pinch-off voltage of FET 130 at 6 volts, at approximately 4½ volts on the gate of this FET current will flow from line 112 through diode 124 and a resistor 136 (2.2 kilohm) to the source of the FET and on to ground. The drop in resistor 136 biases a transistor 138 from emitter to base of which it is connected. The collector of transistor 138 is connected to output line 91 by a voltage divider comprising resistor 92 (10 kilohm) and resistor 95 (2.2 kilohms). Current will thus flow from line 112 through diode 124, transistor 138, and voltage divider 92, 95 to the output line 91. With the circuit as described, this occurs after a 2.8 second time interval.

It will be noted that the output circuits, including transistor 138, are energized through start switch 4 so the timing cycle is interrupted if this switch is opened. Either during a timing cycle or after one has been interrupted by opening of switch 4, the charge on capacitor 128 may be drained off to reset the timing period by closing a reset switch 6 which grounds capacitor 128 through a line 8, a diodoe 152, and switch 6.

It may be mentioned again that switches 4 and 6 are representative of transistorized circuits in the relight sysstem, but that any switching means may be used with the timing circuit described here.

The FET transistors are type 2N4221 UOS, the transistors are type 2N2907 UOS, the transistors are type 2N2907 UOS, and the diodes are type 1N914 UOS.

It will be appreciated by those skilled in the art that we have provided a simple and reliable circuit in which the charging rate of the timing capacitor is accurately regulated by the first FET circuit, in which the point of energization of the output circuit is accurately controlled by the second FET and the controlled voltage circuit, and in which the timing cycle may be interrupted or restarted.

The detailed description of the preferred embodiment of the invention for the purpose of explaining the principles thereof is not to be considered as limiting or restricting the invention, since many modifications may be made by the exercise of skill in the art.

We claim:

1. A timing circuit comprising, in combination, a first FET having its source connected to an input signal line; a resistor and a capacitor connected in series between the drain of the FET and a source of datum potential; a second FEt, the gates of both FET's being connected to the junction between the resistor and capacitor, so that the capacitor is charged by a constant controlled current and the potential on the gate of the second FET rises linearly with time when the signal line is energized; a second resistor connecting the source of the second FET to the input signal line; a source of constant potential intermediate the signal and datum potentials connected to the drain of the second FET; and an output line connected to the junction between the second resistor and the source of the second FET, the second FET energizing the output line at a predetermined level of charge on the capacitor.

2. A timing circuit comprising, in combination, a first FET having its source connected to an input signal line; a resistor and a capacitor connected in series between the drain of the FET and a source of datum potential; a second FET, the gates of both FET's being connected to the junction between the resistor and capacitor, so that the capacitor is charged by a constant controlled current and the potential on the gate of the second FET rises linearly with time when the signal line is energized; a second resistor connecting the source of the second FET to the input signal line; a source of constant potential intermediate the signal and datum potentials comprising a constant-voltage-drop transistor circuit connected between the datum potential source and the drain of the second FET; and an output line connected to the junction between the second resistor and the source of the second FET, the second FET energizing the output line at a predetermined level of charge on the capacitor.

* * * * *